US010958995B2

(12) United States Patent
Eiselt

(10) Patent No.: US 10,958,995 B2
(45) Date of Patent: Mar. 23, 2021

(54) DETERMINATION OF THE LATENCY OF AN OPTICAL TRANSMISSION LINK

(71) Applicant: ADVA Optical Networking SE, Meiningen (DE)

(72) Inventor: Michael Eiselt, Kirchheim (DE)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 16/701,588

(22) Filed: Dec. 3, 2019

(65) Prior Publication Data
US 2020/0196036 A1    Jun. 18, 2020

(30) Foreign Application Priority Data
Dec. 13, 2018    (EP) .................................... 18212474

(51) Int. Cl.
*H04B 10/071*    (2013.01)
*H04Q 11/00*    (2006.01)
(Continued)

(52) U.S. Cl.
CPC ....... *H04Q 11/0067* (2013.01); *H04B 10/071* (2013.01); *H04B 10/0775* (2013.01);
(Continued)

(58) Field of Classification Search
CPC .............. H04B 10/0775; H04B 10/071; H04B 10/0793; H04Q 2011/0083; H04Q 2011/0088
See application file for complete search history.

(56) References Cited

U.S. PATENT DOCUMENTS

| 7,769,041 B2* | 8/2010 | Arrakoski | H04L 47/70 370/442 |
| 8,351,787 B2* | 1/2013 | Luo | H04J 3/0605 398/66 |

(Continued)

FOREIGN PATENT DOCUMENTS

| EP | 2685641 A1 | 1/2014 |
| EP | 2628260 B1 | 1/2016 |

(Continued)

OTHER PUBLICATIONS

M. H. Eiselt and F. Azendorf, "Accurate Measurement of Propagation Delay in a Multi-Span Optical Link," 2019 International Topical Meeting on Microwave Photonics (MWP), Ottawa, ON, Canada, 2019, pp. 1-3 (Year: 2019).*

*Primary Examiner* — Tanya T Motsinger
(74) *Attorney, Agent, or Firm* — The Webb Law Firm

(57) ABSTRACT

Disclosed is a method for determining the link latency of an optical transmission link which includes an end node at each end and one or more pass-through nodes. Each pair of neighboring nodes is connected, at a connection port of each node, by an optical connecting path. Each pass-through node includes an optical pass-through path between its connection ports. The optical connecting paths and optical pass-through paths form an optical link path. A delimiter device includes a delimiter element provided at each connection port of each node. The delimiter element forms a demarcation within the optical link path. According to the method the following steps are carried out: measuring, for each pair of neighboring nodes, a section latency by transmitting a section probe signal from a first one of the pair of nodes to the second one of the pair of nodes; measuring, at the first node, a first time delay of a first reflection signal, which is created by the delimiter element of the delimiter device of the first node by reflecting a power portion of the section probe signal, and a second time delay of a second reflection signal, which is (Continued)

created by the delimiter element of the delimiter device of the second node by reflecting a power portion of the section probe signal received from the first node; and calculating the section latency as half the difference between the second time delay and the first time delay; determining, for each pass-through node either theoretically or by measurement, a pass-through latency of an internal optical pass-through path between the delimiter elements of the delimiter devices of the respective pass-through node; and adding all section latencies and pass-through latencies in order to obtain the link latency of the optical link path.

15 Claims, 5 Drawing Sheets

(51) Int. Cl.
    *H04B 10/079*      (2013.01)
    *H04B 10/077*      (2013.01)
(52) U.S. Cl.
    CPC . *H04B 10/0793* (2013.01); *H04Q 2011/0083* (2013.01); *H04Q 2011/0088* (2013.01); *H04Q 2213/13164* (2013.01)

(56) References Cited

U.S. PATENT DOCUMENTS

| | | | |
|---|---|---|---|
| 9,166,681 B2* | 10/2015 | Cavaliere | H04J 14/0267 |
| 9,838,112 B2* | 12/2017 | Grobe | H04L 7/0075 |
| 10,498,439 B2* | 12/2019 | Brzozowski | H04J 14/02 |
| 2004/0252720 A1* | 12/2004 | Xiong | H04J 3/1617 |
| | | | 370/473 |
| 2012/0082156 A1* | 4/2012 | Swartzentruber | H04L 7/0091 |
| | | | 370/389 |
| 2013/0188947 A1* | 7/2013 | Lee | G01M 11/3136 |
| | | | 398/13 |
| 2014/0181616 A1* | 6/2014 | Arunarthi | H04L 7/0337 |
| | | | 714/755 |
| 2019/0098507 A1* | 3/2019 | Yang | H04L 63/1483 |

FOREIGN PATENT DOCUMENTS

| | | |
|---|---|---|
| EP | 3018837 B1 | 1/2018 |
| EP | 3413481 A1 | 12/2018 |

* cited by examiner

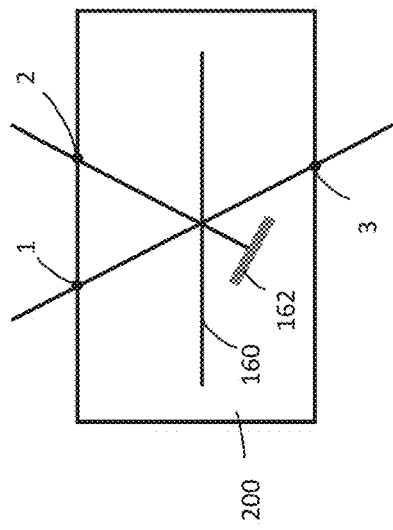
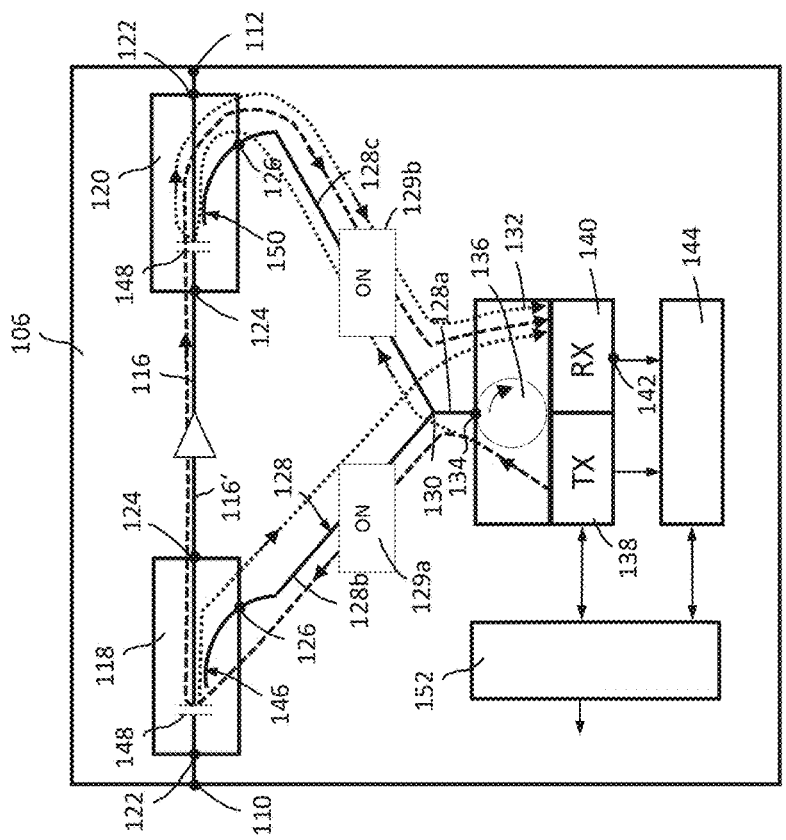
Fig. 5
Fig. 6a
Fig. 6b
Fig. 6c

DETERMINATION OF THE LATENCY OF AN OPTICAL TRANSMISSION LINK

CROSS-REFERENCE TO RELATED APPLICATION

This application claims priority to European Patent Application No. 18 212 474.3 filed Dec. 13, 2018, the disclosure of which is hereby incorporated by reference in its entirety.

BACKGROUND OF THE INVENTION

Field of the Invention

The invention relates to a method for determining the latency of an optical transmission link as well as to an optical transmission link which is configured to realize the method and a pass-through node for such an optical transmission link.

Description of Related Art

For operating an optical transmission link, it is in many cases of decisive interest to exactly know the total link latency, i.e. the time an optical signal needs to travel from one end to the other end of the optical transmission link. In the following description, an optical transmission link shall be understood as any arbitrary link that comprises an end node at both ends thereof and one or more pass-through nodes provided between the two end nodes, wherein neighboring nodes are connected by an optical connection path, usually an optical fiber. Of course, such an optical transmission link may be part of an arbitrarily meshed optical transmission network. Although, in the following description, the end nodes and pass-through nodes of the optical transmission link have an eastern and western connection port, only, each node may of course also have further connection ports, which may be used to establish further optical transmission links within a meshed optical network.

The precise knowledge of the link latency is especially required for synchronizing two or more clocks that are provided in different nodes of a transmission network. As environmental changes influence the group velocity of optical signals in optical paths, it may also be required to monitor the link latency, either continuously or at given time intervals or on request. Whereas for synchronizing clocks a nanosecond accuracy may be sufficient, in other cases, e.g. radiofrequency phase array antennas, the required accuracy is in the order of a few picoseconds.

The optical transmission link consists of optical connection paths, each of which is provided between two neighboring nodes, and optical pass-through paths provided within the pass-through nodes. The optical connection paths, which usually are optical fibers, generally allow for a bidirectional propagation of optical signals. Thus, an optical time domain reflectometer (OTDR) may be used to measure the latency of an optical connection path between two neighboring nodes, which, in the following description, is referred to as section latency. In contrast, an optical pass-through path of a pass-through node may be unidirectional, e.g. if an optical amplifier comprising an optical isolator (e.g. an Erbium-doped fiber amplifier (EDFA)) is comprised within the optical pass-through path. It is of course also possible that an optical pass-through path is bidirectional.

In order to determine the link latency of such an optical transmission link, EP 2 628 260 B1 discloses appropriate methods, in which signal patterns are transmitted within a probe channel between consecutive notes to measure the symmetry of a fiber link latency. After a first measurement in forward direction, in a second measurement the transmission direction is inverted. The latency is calculated from time stamps transmitted over this probe channel. For determining an intra-nodal latency, the latency is likewise measured based on the time-of-flight of a data signal transmitted.

A decisive disadvantage of this measurement method is the limited resolution, which is based on the data rate of the probe signal. The time resolution cannot be better than the time period of the data rate. A further inaccuracy is introduced by the delay of the measurement equipment, which adds approximately 5 ns of delay for every meter of connecting fiber.

EP 3 018 837 B1 discloses a method and apparatus for providing a differential latency between an upstream transmission and a downstream transmission of optical data signals of a bidirectional payload channel at upstream and downstream wavelength within a wavelength band via an optical transmission link comprising an optical fiber having a group index proportional to the round trip delay depending on a signal wavelength. The latency of a fiber section is measured at two different wavelengths by a reflective method similar to correlation OTDR. One end of the fiber section is terminated with a partial reflector. However, this method and apparatus required bidirectional transmission. Further, there is no reference plane at the near end of the fiber section so that a measurement error is introduced by the optical path between the near end and the measurement equipment.

It is thus an object of the present invention, starting from the prior art discussed above, to provide a method for determining the latency of an optical transmission link with high accuracy which can easily be implemented. It is a further object of the invention to provide an optical transmission link which implements this method. Finally, it is an object of the present invention to provide a pass-through node for such an optical transmission link.

SUMMARY OF THE INVENTION

The invention starts from the finding that the accuracy of the measurement or determination of the link latency, i.e. the latency of the optical link path between the two end nodes (more specifically between the respective demarcation defined by a delimiter element of a delimiter device at the respective connection port of each end node) can be decisively improved if a delimiter device comprising a delimiter element is provided within the optical link path at each connection port of each pair of neighboring nodes. The delimiter element of each delimiter device defines a demarcation within the optical link path. In this way, optical section paths are defined between the delimiter elements of delimiter devices provided at the connection ports of neighboring nodes and internal optical pass-through paths are defined between the delimiter elements of the delimiter devices of the pass-through nodes. Thus, section latencies of the optical section paths and pass-through latencies of the internal optical pass-through paths can be measured or determined separately and the link latency of the whole transmission link, i.e. the optical link path, can be calculated as the sum of all section and pass-through latencies.

The accuracy of the method according to the invention is independent of the lengths of the optical paths of the measurement equipment used for measuring the section and, as the case may be, the pass-through latencies.

It shall be emphasized that, in the following description, the term "pass-through latency" designates the propagation delay of an optical signal (of a given wavelength) over the internal optical pass-through path that is provided between the delimiter elements of the first or western and second or eastern delimiter device of a pass-through node. The term "section latency" designates the propagation delay of an optical signal (of a given wavelength) over an optical section path that is provided between the delimiter elements of the first or western delimiter device of a first node of a pair of neighboring nodes and a second or eastern delimiter device of a second node of the pair of neighboring nodes.

As explained above, the method according to the invention allows to determine the link latency of an optical transmission link, which comprises an end node at each end thereof and one or more pass-through nodes, wherein each pair of neighboring nodes is connected, at a connection port of each node, by an optical connecting path, and wherein each pass-through node comprises an optical pass-through path between its connection ports. According to the invention, a delimiter device comprising a delimiter element is provided at each connection port of each node, wherein the delimiter element forms a demarcation within the optical link path. In order to determine the link latency, the method comprises the following steps:

measuring, for each pair of neighboring nodes, a section latency by transmitting a section probe signal from a first one of the pair of nodes to the second one of the pair of nodes, by measuring, at the first node, a first time delay of a first reflection signal, which is created by the delimiter element of the delimiter device of the first node by reflecting a power portion of the section probe signal, and a second time delay of a second reflection signal, which is created by the delimiter element of the delimiter device of the second node by reflecting a power portion of the section probe signal received from the first node, and by calculating the section latency as half the difference between the second time delay and the first time delay;

determining, for each pass-through node either theoretically or by measurement, a pass-through latency of an internal optical pass-through path between the delimiter elements of the delimiter devices of the respective pass-through node; and adding all section latencies and pass-through latencies in order to obtain the link latency.

In practice, the pass-through latencies of the optical pass-through path between the delimiter devices of the respective pass-through node may be theoretically calculated taking into account the length and the optical properties that influence the wavelength-dependent group velocity, which further depends on the geometry and the material of the optical pass-through paths as well as on environmental influences, especially the temperature.

If the pass-through latencies are determined by measurement, the respective measurement may be carried out before the respective pass-through node is put into operation or even before it is installed within the optical transmission link. The values or dependencies (i.e. analytical or discrete dependencies of the pass-through latency that take into account important parameters, especially the wavelength of an optical signal and the temperature) of the pass-through latency can be stored in the respective pass-through node and/or a central control device of the optical transmission link.

The measurement of the pass-through latencies can be carried out once the optical transmission link is readily installed or even during operation of the optical transmission link. Of course, in the latter case, the measurement must be carried out using optical signals having a wavelength or a spectrum that does not interfere with the wanted optical signals transmitted over the optical transmission link.

In practice, the time delay measurements may be realized using high-accuracy correlation techniques, e.g. by using a correlation OTDR. However, any method and corresponding measurement device may be used that is capable of measuring the time delay between selected events (e.g. signal peaks) included in an optical signal received as a response to an optical probe signal. Of course, instead of directly determining the time delay between a first and a second event, it is possible to determine a first time delay of the first event relative to a given reference time, e.g. the start time of the probe signal (i.e. the point in time at which the probe signal is fed to the optical probe path), and a second time delay of the second event relative to the same reference time and to determine the desired time delay by calculating the difference between the second and first time delay. In this way, different probe signals can be used for measuring the first and second time delay.

According to an embodiment of the invention, the pass-through latency of a bidirectional internal optical pass-through path of a pass-through node is determined by feeding the pass-through probe signal, via a probe signal path, to a first one of the delimiter devices, measuring, relative to the start time or another reference time, a first time delay of a first reflection signal created by the first delimiter device by reflecting a power portion of the pass-through probe signal to the probe signal path, measuring, relative to the start time or another reference time, a second time delay of a second reflection signal created by a second one of the delimiter devices by reflecting a power portion of the pass-through probe signal that is transmitted by the first delimiter device to the second delimiter device via the optical pass-through path, wherein the first delimiter device is configured to transmit a power portion of the pass-through probe signal reflected by the second delimiter device to the probe signal path, or by directly measuring the time delay between the first and second reflection signal, and calculating the pass-through latency as half the difference between the separately measured second and first time delay or as half the directly measured time delay.

As both reflected signal portions of the pass-through probe signal at the first one of the delimiters and the second one of the delimiters of the respective pass-through node travel over the probe signal path, the signal propagation time over the probe signal path is eliminated by calculating or directly measuring the time difference between the reflected signal portions.

Further, as the delimiters form demarcations for both the section probe signals and the pass-through probe signals, the sum of all section latencies and pass-through latencies exactly corresponds to the link latency of the whole optical transmission link.

According to another embodiment of the invention, the pass-through latency of a unidirectional or bidirectional internal optical pass-through path of a pass-through node, which comprises a common probe signal path that is split into a first probe signal path connected to a first one of the delimiter devices and a second probe signal path connected to a second one of the delimiter devices, is determined by measuring a first time delay of a reflection signal created by the first one of the delimiter devices by reflecting, into the first probe signal path, a power portion of a pass-through probe signal that is fed to the common probe signal path, measuring a second time delay of a reflection signal created by the second one of the delimiter devices by reflecting, into the second probe signal path, a power portion of the same or another pass-through probe signal, measuring a third time delay of a transmission signal created by feeding the same or another pass-through probe signal to the first delimiter device, which is configured to transmit a power portion of the pass-through probe signal, via the optical pass-through path, to the respective other delimiter device, which is configured to transmit at least a power portion of the pass-through probe signal received, as the transmission signal, to the second probe signal path, and calculating the pass-through latency as the difference of the third time delay and half the sum of the first time delay and the second time delay.

The measurements for determining the first, second and third time delay can of course be performed by using a single pass-through probe signal or by two or more pass-through probe signals. Usually, the time delays are measured relative to the start time at which the respective pass-through probe signal is fed to the common probe signal path. However, instead of this start time, any other reference time might be used. However, if different pass-through probe signals are used for measuring the time delays, either the respective start time must be used in order to determine the respective time delay or the identical systematic deviation from the start time.

This method for determining the pass-through latency of a pass-through node is also suitable for unidirectional optical pass-through paths. Of course, the pass-through probe signal that is used to measure the third time delay must be supplied to the delimiter device which reflects and outputs at least a portion of the optical pass-through probe signal to the optical pass-through path in its transmission direction (i.e. in the direction in which the optical pass-through path allows signal transmission).

The measurement of the first, second and third time delays may be carried out by using the same pass-through probe signal that is fed to the common probe signal path.

Alternatively, the measurement of the first time delay may be carried out using one or more first pass-through probe signals, wherein the second probe signal path is blocked during this measurement step, e.g. by means of an optical switch. The measurement of the second time delay may be carried out using one or more second pass-through probe signals, wherein the first probe signal path is blocked during this measurement step, e.g. by means of an optical switch. The measurement of the third time delay may be carried out using one or more third pass-through probe signals, wherein the first and second probe signal paths are not blocked during this measurement step.

In this way, it is possible to increase the accuracy, especially if the latencies of the first and second probing path are close to each other, so that superimposed peaks in the optical signal received via the common optical probe path overlap to such an extent that they cannot be clearly resolved.

According to a further embodiment, the section or pass-through probe signals may have a wavelength equal to a wavelength of a wanted data signal that is transmitted over the optical transmission link when it is in operation, wherein determining of the section and node latencies is carried out when the optical transmission link is out of service.

In this case, the latency can be determined at the one or more operating wavelengths (which might be of interest if the optical transmission link is an optical WDM transmission link). For this purpose, in the pass-through nodes, an optical probe signal transceiver for creating the probe signals and receiving respective reflected or transmitted signals created by the delimiter devices in response to the probe signals may be provided which comprises a tunable laser. In this way, the wavelength-dependent section and link latencies may be measured at each wavelength of a wanted data signal.

A further slight disadvantage of this method (apart from the fact that the latency measurements can only be performed when the transmission link is out of operation) is that the delimiter devices must be configured to reflect at least a small portion of a probe signal that has the wavelength of a respective wanted data signal. Thus, an additional attenuation is introduced into the optical transmission link by each of the delimiter devices. However, this method does not require any interpolation, extrapolation or any other calculation based on the measured latencies in order to determine the desired link latency at the wavelength of a wanted data signal.

In another embodiment of the invention, the section or pass-through probe signals may have a wavelength outside a bandwidth that is reserved for wanted data signals that are transmitted over the optical transmission link when it is in operation, wherein determining of the section and node latencies is carried out when the optical transmission link is in or out of service.

In this case, the delimiters are preferably designed in such a way that optical signals having a wavelength corresponding to the wavelength of wanted data signals are passed through (from the respective connection port of the pass-through node to the optical pass-through path, or vice versa) essentially without attenuation or with an acceptable low attenuation, whereas optical probe signals are at least partially reflected.

Such embodiments allow to measure the section and pass-through latencies when the optical transmission link is in operation without affecting the transmission of the wanted data signals. It is even possible to monitor the link latency of the optical transmission link by continuously carrying out the method or carrying out the method on request or at predetermined points in time.

According to an embodiment of the invention, each section and pass-through latency may be determined at two or more different wavelengths, preferably at at least one wavelength above and below a wavelength of a wanted data signal or the bandwidth that is reserved for wanted data signals, and that the section or pass-through latencies are calculated using linear or non-linear interpolation or a known (e.g. analytical) dependency of the respective section or pass-through latency on the wavelength taking into account known properties or parameters of the connecting paths or the optical pass-through paths.

An optical transmission link according to the invention comprises an end node at each end thereof and one or more pass-through nodes and a central control device, which is connected to selected ones of the end nodes and pass-through nodes, wherein a first node of each pair of neighboring nodes comprises a first connection port and a second node of the respective pair of neighboring nodes comprises a second connection port, the first and second connection ports being connected by an optical connecting path, and wherein each pass-through node comprises an optical pass-through path which optically connects its connection ports, the optical connecting paths and optical pass-through paths forming an optical link path.

A first node of each pair of neighboring nodes comprises
an optical probe signal transceiver configured to create and output, at an optical transceiver port, optical probe signals and to receive, at the optical transceiver port, reflected or transmitted probe signal portions and to output, at an electrical output port, an electrical receive signal that is created by opto-electrically converting the reflected or transmitted probe signal portions received,
a first delimiter device comprising a first port, which is connected to or defines the first connection port and which has a probe signal port that is connected to the optical transceiver port via an optical probe signal path, wherein the first delimiter device is configured to create, by means of a delimiter element provided within the optical link path, a first reflection signal by reflecting a power portion of a probe signal received at the probe signal port, the first reflection signal being output at the probe signal port, and to transmit a power portion of the probe signal to the connection port,
a time delay measurement device to which the electrical receive signal is fed by the optical probe signal transceiver, the time delay measurement device being configured to measure one or more time delays between at least a first and a second signal from the group of a transmitted probe signal, a reflected probe signal portion and a transmitted probe signal portion, and
a control device which is configured to control the optical probe signal transceiver and the time delay measurement device.

A second node of each pair of neighboring nodes comprises a second delimiter device having a first port, which is connected to or defines the second connection port, the second delimiter device being configured to reflect, by means of a delimiter element provided within the optical link path, a power portion of a probe signal received at the respective connection port, the reflected power portion of the probe signal being output at the first port.

Each control device of each first node is configured to control the optical probe signal transceiver and the time delay measurement device in such a way
that the optical probe signal transceiver creates a section probe signal at a start time, wherein a first reflection signal created by the first delimiter device of the first node and a second reflection signal created by the second delimiter device of the second node are received and opto-electrically converted by the optical probe signal transceiver, and
that the time delay measurement device measures, relative to the start time or another reference time, a first time delay of a first reflection signal created by the first delimiter device by reflecting a power portion of the section probe signal, and a second time delay of a second reflection signal created by the second delimiter device by reflecting a power portion of the section probe signal received from the first node,
wherein each control device of each first node is configured to calculate a section latency of the optical path between the delimiter element of the delimiter device of the first node and the delimiter element of the delimiter device of the second node of the respective pair of nodes as half the difference between the second time delay and the first time delay.

The central control device is configured to receive all section latencies from each first node of each pair of neighboring nodes and to determine a link latency of the optical transmission link using the sum of all section latencies and a sum of all pass-through latencies.

As already explained above, the pass-through latencies may either be determined theoretically or by measurement. The latency of a pass-through node may be stored in the respective pass-through node and transmitted to the central control device, e.g. by using a control channel that is implemented in the optical transmission link. However, the pass-through nodes may be connected to the central control device in any other manner, e.g. by a separate port. The central control device may be provided within one of the end nodes or at a different location, e.g. a central network control device of a network comprising the optical transmission link.

According to an embodiment of the invention, each pass-through node of the optical transmission link may be configured to measure its pass-through latency and to communicate the pass-through latency to the central control device.

The invention further provides a pass-through node for such an optical transmission link comprising a first and a second connection port, each of which is configured to be connected to an optical connecting path of the optical transmission link, an optical pass-through path connecting the first and second connection ports, a first and a second delimiter device provided at the first and second connection ports within the optical pass-through path, an optical probe signal transceiver having an optical transceiver port and an electrical output port, a time delay measurement device and a control device. A first port of the first delimiter device is connected to or defines the first connection port and a first port of the second delimiter device is connected to or defines the second connection port. Second ports of the first and second delimiter devices are connected to an inner portion of the optical pass-through path. A probe signal port of the first delimiter device is connected to an optical probe signal path, which connects the optical probe signal port and the optical transceiver port of the optical probe signal transceiver. The optical probe signal transceiver is configured to create and output, at the optical transceiver port, at least one probe signal and to receive, at the optical transceiver port, reflected or transmitted probe signal portions and to output, at the electrical output port, an electrical receive signal that is created by opto-electrically converting the reflected or transmitted probe signal portions received. The first delimiter device is configured to reflect, by means of a delimiter element provided within the optical pass-through path, a power portion of a probe signal received at the probe signal port and to output at least a portion of the reflected power portion at the probe signal port, to transmit a power portion of a probe signal received at the probe signal port to its first port, and to transmit at least a power portion of a probe signal received at the first port to the probe signal port. The second delimiter device is configured to reflect, by means of a delimiter element provided within the optical pass-through path, a power portion of a probe signal received at the first port and to output at least a power portion of the reflected power portion at the first port. The time delay measurement device is configured to measure one or more time delays between at least a first and a second signal from the group of a transmitted probe signal, a reflected probe signal portion and a transmitted probe signal portion. The control device is configured to control the optical probe signal transceiver and the time delay measurement device, when the pass-through node is in operation in an optical transmission link, in such a way that the optical probe signal transceiver creates a section probe signal at a start time, that the optical probe signal transceiver receives a reflection signal created by the first delimiter device (by directly reflecting the section probe signal to the probe signal port) and a transmission signal, which is created by the delimiter device of a neighboring node (by directly reflecting the section probe signal to the first port) and transmitted by the first delimiter device (i.e. the reflected section probe signal is received by the first delimiter device at its first port and at least partially transmitted to the signal probe port), and that the optical probe signal transceiver outputs corresponding opto-electrically converted signals to the time delay measurement device, and that the time delay measurement device measures, relative to the start time or another reference time, a first time delay of the reflection signal and a second time delay of the transmission signal. The control device is configured to calculate a section latency as half the difference between the second time delay and the first time delay.

Such a pass-through node comprises a well-defined demarcation at each connection port (realized by the delimiter devices) that is passed by probe signals incoming at the connection ports. Thus, the section latencies of an optical transmission link comprising such pass-through nodes can easily be measured with high accuracy. The pass-through node is configured to create section probe signals for measuring the section latency of the optical connecting path that is connected to the first connection port and the first port of the first delimiter device, respectively, and the connection port of the respective neighboring node. Of course, the neighboring node may be an end node or a further pass-through node, wherein the second delimiter device of the neighboring node (which may have an identical design) is configured to reflect a power portion of a probe signal which is fed to the second connection port, i.e. the first port of the second delimiter device, and to output this reflected probe signal at its first port.

It shall be mentioned at this point that the term "probe signal" is used throughout this description for the originally created probe signal that is output at the transceiver port of the optical probe transceiver as well as for reflected power portions thereof, especially in passages in which it is clear which meaning of this term shall apply.

As mentioned above, the pass-through node may be configured to measure the latency of its optical pass-through path. In this case, the first delimiter device is further configured to output, at the second port, a power portion of the reflected power portion of a probe signal received at the probe signal port, and to reflect a power portion of a probe signal received at the second port and to output at least a power portion thereof at the probe signal port. The second delimiter device is further configured to reflect a power portion of a probe signal received at the second port and to output the reflected power portion at the second port. The control device is configured to control the optical probe signal transceiver and the time delay measurement device in such a way
that the optical probe signal transceiver creates a pass-through probe signal at a start time and receives a first reflection signal created by the first delimiter device by directly reflecting, to the probe signal port, a probe signal received at the probe signal port and a second reflection signal created by the second delimiter device (by reflecting, to the second port, at least a power portion of a probe signal received at the second port) and by the first delimiter device (by reflecting at least a power portion of the probe signal received at the second port and outputting at least a power portion thereof at the probe signal port), and outputs corresponding opto-electrically converted signals to the time delay measurement device, and
that the time delay measurement device measures, relative to the start time or another reference time, a first time delay of the first reflection signal and a second time delay of the second reflection signal.

In this embodiment, the control device is configured to calculate a pass-through latency as half the difference of the second time delay and the first time delay.

Of course, in this embodiment, the optical pass-through path (i.e. also the internal optical pass-through path) must be bidirectional as the probe signal, which is received at the probe signal port of the first delimiter device and output at its second port, travels in one direction over the optical pass-through path and the power portion of this probe signal, which is directly reflected by the second delimiter device, travels in the opposite direction over the optical pass-through path.

According to another embodiment of a pass-through node, the optical pass-through path may also be unidirectional. In this embodiment, the probe signal path comprises an optical 1×2 coupler, wherein a common port is connected to the optical transceiver port, a first splitting port is connected to the probe signal port of the first delimiter device and a second splitting port is connected to the second delimiter device. The first delimiter device is further configured to output, at the second port, a power portion of the reflected power portion of a probe signal received at the probe signal port. The second delimiter device is further configured to reflect a power portion of a probe signal received at the probe signal port and to output at least a portion of the reflected power portion at the probe signal port, and to output, at the probe signal port, a power portion of a probe signal received at the second port. The control device is configured to control the optical probe signal transceiver and the time delay measurement device in such a way
that the optical probe signal transceiver creates a pass-through probe signal at a start time and receives a first reflection signal created by the first delimiter device (by directly reflecting, to the probe signal port, a power portion of a probe signal received at the probe signal port), and a second reflection signal created by the second delimiter device (by directly reflecting, to the probe signal port, a power portion of a probe signal received at the probe signal port), and a transmission signal created by the first delimiter device and the second delimiter device (wherein the first delimiter device receives a probe signal at the probe signal port and outputs a reflected portion thereof at the second port, which is received by the second delimiter device at its second port and output at its probe signal port), and outputs corresponding opto-electrically converted signals to the time delay measurement device, and
that the time delay measurement device measures, relative to the start time or another reference time, a first time delay of the first reflection signal, a second time delay of the second reflection signal and a third time delay of the transmission signal.
In this embodiment, the control device is configured to calculate a pass-through latency as the difference of the third time delay and half the sum of the first and second time delays.

As the same demarcations, namely, the first and second delimiter devices, are used for measuring the section latency and the pass-through latency, the sum of the section and pass-through latencies of an optical transmission link comprising such pass-through nodes corresponds to the (total) link latency with high accuracy.

According to an embodiment, the pass-through node may comprise a first controllable optical ON/OFF switch, which is provided in the branch of the optical probe path between the optical 1×2 coupler and the probe signal port of the first delimiter device, and a second controllable optical ON/OFF switch, which is provided in the branch of the optical probe path between the optical 1×2 coupler and the probe signal port of the second delimiter device, wherein the controllable optical ON/OFF switches are controlled by the control device.

In this embodiment, the signals which are directly reflected by the first and second delimiter device (i.e. the signals received at the respective probe signal port, partially reflected by the delimiter element of the respective delimiter device and output at the respective probe signal port) can be detected separately, if only either the first or the second optical ON/OFF switch is switched into an ON state, i.e. a state in which the respective probe signals are transmitted through the switch. If both ON/OFF switches are controlled to the ON state, the probe signal that is transmitted through the first and second delimiter device can be measured.

More specifically, in such an embodiment, the control device may be adapted, for determining the pass-through latency, to control the first controllable optical ON/OFF switch into the ON-state and the second controllable optical ON/OFF switch into the OFF-state, to control the optical probe signal transceiver to create, at a first start time, a first optical pass-through probe signal and to control the time delay measurement device to measure, relative to the first start time, the first time delay of the first reflection signal created by the first delimiter device, to control the first controllable optical ON/OFF switch into the OFF-state and the second controllable optical ON/OFF switch into the ON-state, to control the optical probe signal transceiver to create, at a second start time, a second optical pass-through probe signal and to control the time delay measurement device to measure, relative to the second start time, the second time delay of the second reflection signal created by the second delimiter device, and to control the first and second controllable optical ON/OFF switches into the ON-state, to control the optical probe signal transceiver to create, at a third start time, a third optical pass-through probe signal and to control the time delay measurement device to measure, relative to the third start time, the third time delay of the transmission signal.

BRIEF DESCRIPTION OF THE DRAWINGS

These and other features and objects of the present invention will become more fully apparent from the following description of specific embodiments thereof which are illustrated in the drawings. It is appreciated that these drawings depict only typical embodiments of the invention and are therefore not to be considered limiting of its scope. The invention will be described and explained with additional specificity and detail through the use of the accompanying drawings in which:

FIG. 5 shows a schematic diagram of the optical pass-through node of the embodiment according to FIG. 2 comprising a unidirectional pass-through path, which also illustrates the propagation of the optical pass-through probe signal and its reflected portions for measuring the pass-through latency; and FIGS. 6*a*-6*c* show an embodiment of a delimiter device that uses a wavelength-dependent filter and a mirror (FIG. 6*a*) having an advantageous characteristic with respect to the insertion loss at the probe wavelengths (FIG. 6*b*) and signal wavelengths (FIG. 6*c*).

DESCRIPTION OF THE INVENTION

Figure 1:
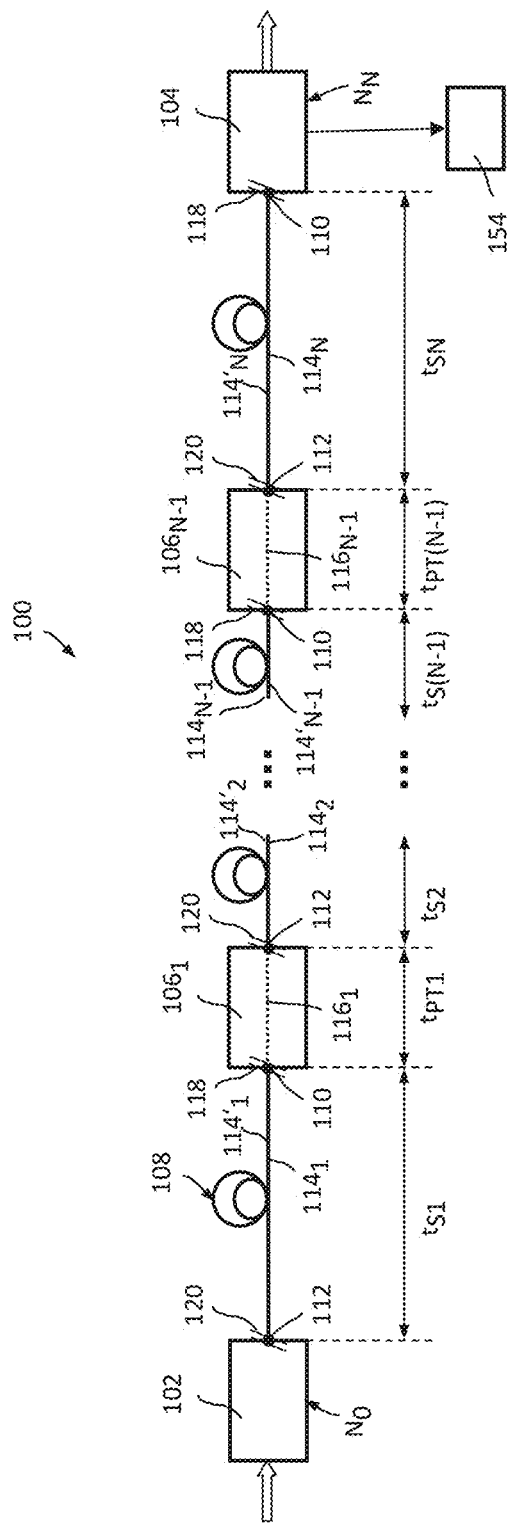
FIG. 1 shows a schematic diagram of an optical transmission link according to the present invention.

FIG. 1 shows an optical transmission link 100 comprising a number of N+1 nodes, which are connected to each other in a linear structure. The first node and the last node of the optical transmission link 100 are designates as end nodes 102, 104, which are connected to each other via an optical link path 108 and N−1 pass-through nodes 106 provided within the optical path 108 (in the following, the reference sign 106 refers to any arbitrary number of or all pass-through nodes $106_1$ to $106_{n-1}$). The end node 102 receives information to be transmitted over the optical transmission link 100 to the end node 104 and creates and outputs one or more optical signals to the optical path 108. The end node 104 receives one or more optical signals and further processes and/or outputs information received. The pass-through nodes 106 comprise a western or first connection port 110 and an eastern or second connection port 112, wherein each pass-through node 106 is capable of receiving a wanted optical signal from the neighboring node and outputting a wanted optical signal to the neighboring node on the respective other eastern or western side. Each pass-through node 106 may be configured to modify the optical signal received and to output a correspondingly modified signal at the respective other eastern or western connection port. For example, the optical transmission link 100 may be a WDM transmission link and the pass-through nodes 106 may be add/drop nodes, which are configured to drop an optical channel signal from the optical signal received, which in this case is of course an optical WDM signal, and/or to add an optical channel signal to the optical signal received.

As apparent from FIG. 1, the respective connection ports 110, 112 of two neighboring nodes are connected via an optical connecting path 114, usually realized as an optical fiber (in the following, the reference sign 114 refers to any arbitrary number of or all optical connecting paths $114_1$ to $114_N$). Specifically, the western connection port 110 of the first pass-through node $N_1$ is connected to a single eastern connection port 112 of the end node 102, the western and eastern connection ports 110, 112 of two neighboring pass-through nodes 106 are connected to each other and the eastern connection port 112 of the last pass-through node $N_{N-1}$ is connected to a single western connection port 110 of the end node 104.

Of course, the optical transmission link 100 may be a part of a complex optical transmission network (not shown) having a plurality of nodes of different types. Generally, the optical transmission link 100 may be a bidirectional or unidirectional link, i.e it may be configured to transmit optical signals in both directions between the end nodes 102, 104 over the optical path 108 or in one direction only.

At any rate, each of the pass-through nodes 106 comprises an optical pass-through path 116, which is provided between the western and eastern connection ports 110 and 112, and is configured to transmit the full or at least a part of the optical signal received at one of the western or eastern connection ports to the respective other connection port (in the following, the reference sign 116 refers to any arbitrary number of or all optical pass-through paths $116_1$ to $116_{N-1}$). Thus, the link latency $\tau_L$ of an optical signal transmitted by one of the end nodes 102, 104 to the respective other end node, which is defined by the properties of the optical link path 108, depends on properties of the optical connecting paths 114 and the optical pass-through paths 116, which form the optical link path 108. The group velocity of an optical signal in an optical path and thus the respective latency especially depends on the geometry, the material and the temperature of the material. The group velocity further depends on the wavelength of the optical signal. If the optical signal has a spectral bandwidth that cannot be approximated by a single wavelength, the properties of the optical path, especially the geometry and materials thereof, may cause dispersion.

If, in the present description, an optical signal is described as having a specific wavelength, it is assumed that the spectral bandwidth of the optical signal might not be infinitesimally small but at least so small that the optical transmission characteristics of the optical signal can be approximated by the transmission characteristics of an optical signal having a corresponding single wavelength.

As shown in FIG. 1, at each first or western connection port 110 a demarcation means in the form of a delimiter device 118 and at each second or eastern connection port 120 a demarcation means in the form of a delimiter device 120 is provided within the optical link path 108. The delimiter devices 118, 120 provided within the optical link path 108, strictly speaking, delimiter elements 148 (FIG. 2) comprised by the delimiter devices 118, 120 (as explained below), form a demarcation between the optical section paths 114 and the neighboring pass-through paths 116. The delimiter device 120 at the connection port 112 of the end node 102 and the delimiter device 118 at the connection port 110 of the end node 104 (more precisely the delimiter elements thereof) define the ends of the optical link path 108, i.e. the western end of the optical section path $114_1$ and the eastern end of the optical section path $114_N$.

As it will become apparent from the following description, the delimiter devices 118, 120 are configured to reflect and, as the case may be, transmit at least a portion of an optical probe signal that is supplied thereto in such a way that the section latencies and, as the case may be, pass-through latencies can be measured by detecting the latency of transmitted and/or reflected portions of the probe signal.

Selected nodes may comprise measurement means to measure the section latencies defined between these nodes and a respective neighboring node. The section latencies may be transmitted to a central control device 154, which may then use the section latencies $t_{Si}$ of all sections of the optical transmission link 100 to calculate the link latency $\tau_L$ as the sum of all section latencies $t_{Si}$.

Figure 2:
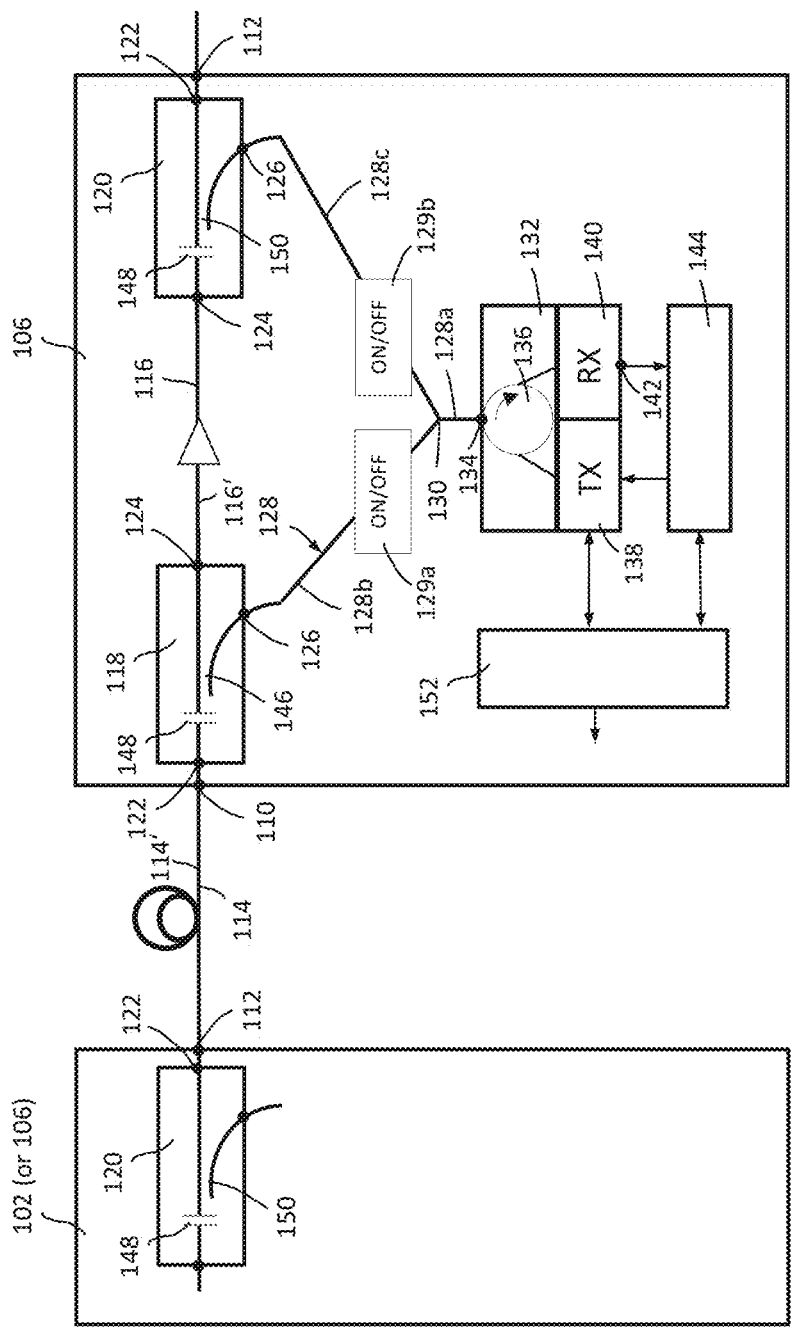
FIG. 2 shows a schematic diagram of two neighboring nodes of the optical transmission link in FIG. 1.

FIG. 2 shows two neighboring nodes of the transmission link in FIG. 1, which are connected by the respective optical section path 114. As apparent from FIG. 2, the node on the right side is a pass-through node 106 and the node on the left side may be the (western) end node 102 or a further pass-through node. However, it will be apparent from the following description that the left node may also be a further pass-through node 106.

As apparent from FIG. 2, the pass-through node 106 comprises a first or western delimiter device 118 and a second or eastern delimiter device 120. The (western) neighboring node 102 or 106, respectively, also comprises a delimiter device 120. Each of the western and eastern delimiter devices 118, 120 has a first port 122 connected to the western and eastern connection port 110, 112 of the node, respectively (of course, the first ports 122 and the respective connection port may be identical, i.e. the optical path lies therebetween), and a second port 124 connected to the respective end of the pass-through path 116. Further, each of the western and eastern delimiter devices 118, 120 has a probe signal port 126 connected to an optical probe signal path 128.

In the embodiment shown in FIG. 2, the probe signal path 128 comprises an optical 1×2 coupler 130, which splits a common branch 128a of the probe signal path 128 into a first branch 128b that is connected to the probe signal port 126 of the western delimiter device 118 and a second branch 128c that is connected to the probe signal port 126 of the eastern delimiter device 120. A controllable optical ON/OFF switch 129a is provided within the first branch of the probe signal path 128 and a further controllable optical ON/OFF switch 129b is provided within the second branch of the probe signal path 128.

The pass-through node 106 further comprises an optical probe signal transceiver 132, which is configured to create and output, at an optical transceiver port 134, an optical probe signal and to receive, at the optical transceiver port 134, reflected or transmitted probe signals, more specifically, reflected or transmitted portions of probe signals that have been output at the optical transceiver port 134. As apparent from FIG. 2, the probe signal transceiver 132 may comprise an optical circulator 136, which is coupled to the optical transceiver port 134, an optical transmitter 138 and an optical receiver 140. The circulator 136 is adapted to receive an optical probe signal created by the optical transmitter 138 and outputs this signal at the optical transceiver port 134. Further, the circulator 136 is adapted to receive a reflected or transmitted probe signal at the optical transceiver port 134 and outputs this signal to the optical receiver 140.

The optical probe signal transceiver 132, more specifically the optical receiver 140, converts an optical signal received into a corresponding electrical signal and outputs this signal at an electrical output port 142, which is connected to a time delay measurement device 144, comprised by the pass-through node 106. The time delay measurement device 144 is configured to measure the time difference between a reference point in time, e.g. a start time $t_0$ of a probe signal created by the optical transmitter 138, and a signal received at the optical transceiver port 134, for example a reflected or transmitted portion of the probe signal. For example, the combination of the optical probe signal transceiver 134 and the time delay measurement device 144 may be realized as OTDR of any type. Especially the use of a correlation OTDR makes it possible to measure a desired time delay with high accuracy and high resolution (in the range of a few picoseconds).

An OTDR makes it possible to scan the presence of an optical signal at the optical transceiver port 134 and thus to measure the time difference between a start time or any other reference time and any point or event included in a signal received. It is also possible to directly measure the time difference between two different events in a signal received, e.g a first and a second signal peak.

In the following, the design and functionality of the delimiter devices 118 and 120 are explained in detail with reference to FIG. 2.

The western delimiter device 118 comprises an optical 1×2 coupler 146 and a delimiter element 148, which is provided within the optical pass-through path 116 and thus within the optical link path 108. The delimiter element 148 may, for example, be realized as optical reflector that partially reflects an optical probe signal created by the optical probe signal transceiver 132.

Similarly, the eastern delimiter device 120 comprises an optical 1×2 coupler 150 and a delimiter element 148, which is provided within the optical pass-through path 116 and thus within the optical link path 108. The delimiter elements 148 may, for example, be realized as optical reflectors that partially reflect an optical probe signal created by the optical probe signal transceiver 132. Preferably, the delimiter elements 148 are configured to reflect a minor power portion (e.g. 1 to 10%) and to transmit the remaining power portion of an optical probe signal.

That is, strictly speaking, the delimiter elements 148 of the western and eastern delimiter devices 118, 120 define the demarcations within the optical link path 108. Therefore, the link latency of the optical link path between the delimiter element 148 of the eastern delimiter device of the western end node 102 and delimiter element 148 of the western delimiter device of the eastern end node 104 can be determined by separately measuring the latencies of the optical paths between the neighboring delimiter elements 148.

In the following, the optical paths between two delimiter elements 148 of western delimiter device 118 and an eastern delimiter device 120 of two neighboring nodes (whether or not both nodes are pass-through nodes 106 or one of the nodes is an end node 102, 104) are referred to as optical section paths 114'. The optical section path between two specific neighboring optical nodes is referred to as 114'$_i$ (1≤i≤N). Here, the same nomenclature is used as for the designation of the optical connection paths 114. The propagation delay of an optical signal (of a given wavelength) over an optical section path 114' is designated as section latency $\tau_S$. The section latency of a specific optical section path 114'$_i$ is designated by $t_{Si}$. The optical path between two delimiter elements 148 of the two delimiter devices 118, 120 of an (arbitrary) optical pass-through node 106 is referred to as internal optical pass-through path 116'. The internal optical pass-through path of a specific optical node is referred to as 116'$_j$ (1≤j≤N−1). In this regard, the same nomenclature is used as for the designation of the optical pass-through paths 116. The propagation delay of an optical signal (of a given wavelength) over an internal optical pass-through path 116' is designated as section latency $\tau_S$. The pass-through latency of a specific internal optical pass-through path 116'$_j$ is designated by $t_{PTj}$.

The optical coupler 146 may be an asymmetric (tap) coupler, which is configured to feed a minor power portion of an optical probe signal (of a given wavelength) received at the first port 122 to the probe signal port 126 and the remaining power portion to the second port 124. In the opposite direction, the optical coupler 146 is capable of integrating an optical probe signal into the internal optical pass-through path 116' toward the delimiter element 148.

The delimiter device 120 comprising the delimiter element 148 and the optical coupler 150 has corresponding properties.

In order to determine the section latency 114, a control device 152 comprised by the pass-through node 106 controls the optical probe signal transceiver 132 and the time delay measurement device 144 as well as the optical ON/OFF switches in such a way that the following method is carried out:

At first, the control device 152 controls the controllable optical ON/OFF switch 129a into the closed, i.e. "ON", state and the controllable optical ON/OFF switch 129b into an open, i.e. "OFF", state. In a next step, the optical transmitter 138 is controlled to create, at a start time $t_{start}$, an optical section probe signal having a predetermined probe signal wavelength, which is output, via the optical circulator 136, at the optical transceiver port 134. The optical probe signal further propagates, via the common branch 128a of the optical probe signal path 128, the 1×2 coupler 130, the branch 128b of the optical probe signal path 128 and the optical ON/OFF switch 129a, toward the probe signal port 126 of the western delimiter device 118 of the pass-through node 106. This section probe signal is fed into the internal optical pass-through path 116' by the optical coupler 146. The delimiter element 148 reflects a minor power portion of the optical probe signal and transmits the remaining power portion toward the first port 122 and the connection port 110, respectively. At least a power portion of the reflected signal portion is tapped-off from the internal optical pass-through path 116' by the optical coupler 146 and output at the probe signal port 126 of the delimiter device 118. This signal propagates, via the branch 128b of the optical probe signal path 128 and the optical ON/OFF switch 129a, the optical coupler 130 and the common branch 128a of the optical probe signal path 128, toward the optical transceiver port 134. This reflected signal is fed to the optical receiver 140 by the optical circulator 136, which opto-electrically converts the optical signal received into a corresponding electrical signal, which is output, at an electrical output port of the optical probe signal transceiver 132, to the time delay measurement device 144. The time delay measurement device receives the electrical signal and carries out, as the case may be, under control of the control device 152, an appropriate technique or method for measuring the time delay $t_1$ between the start time $t_{start}$ and the time at which the reflected portion of the optical section probe signal has been received by the optical transceiver 132.

The power portion of the optical probe signal that is transmitted through the delimiter element 148 of the delimiter device 118 propagates via the optical section path 114' toward the delimiter element 148 of the delimiter device 120 comprised within the neighboring nodes 102 (or 106). This delimiter element 148 reflects a minor power portion of the optical section probe signal received and a major power portion thereof is output at the first port 122 of the delimiter device 120 and the eastern connection port 112, respectively, due to the properties of the optical asymmetric coupler comprised within the optical delimiter device 120. This reflected power portion of the optical section probe signal propagates back toward the delimiter device 118 of the pass-through node 106, from which the optical section probe signal originated. The delimiter element 148 of the delimiter device 118 transmits a major portion of the signal received to the optical coupler 146, which taps off a minor portion of the signal portions received and outputs this optical signal at the probe signal port 126. This optical signal is received by the optical probe signal transceiver 132 in the same way as described above in connection with the directly reflected signal portion of the optical section probe signal.

The time delay measurement device 144 receives this signal and measures, as the case may be under control of the control device 152, the time delay $t_2$ of this signal received versus the start time $t_{start}$. As both signal portions, i.e. the signal portion of the optical section probe signal that is directly reflected by the delimiter element 148 of the delimiter device 118 and the signal portion that is reflected by the delimiter element 148 of the delimiter device 120 of the neighboring node, propagate over the same optical path which is defined between the delimiter element 148 of the delimiter device 118 and the optical probe signal transceiver 132 (more precisely, the optical transmitter 138 and the optical receiver 140, respectively), the difference between the two time delays of these two optical signals measured by the time delay measurement device 144 equals twice the section latency $\tau_S$.

It is of course also possible, depending on the design of the time measurement device 144, that the time delay measurement device 144 directly measures the time delay $\Delta t = t_2 - t_1$ between the two events in the signals received. For example, if the time delay measurement device 144 is an OTDR, e.g. a correlation OTDR, the time delay measurement device 144 may determine the time position of the two reflection peaks created by the reflection of the optical section probe signal at the delimiter elements 148 of the optical delimiter devices 118 and 120 and directly determine the time difference $\Delta t$ between these two reflection peaks.

Figures 3A, 3B:
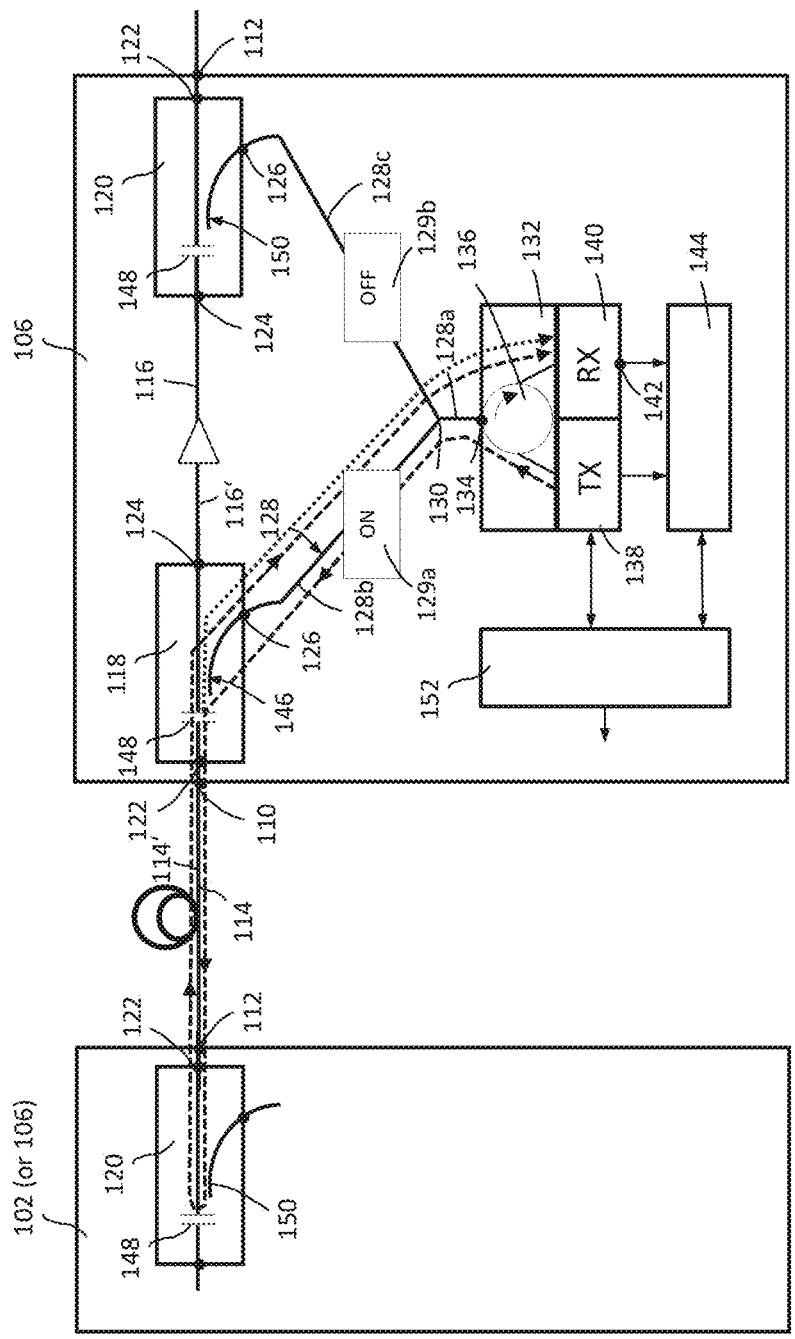
FIGS. 3*a* and 3*b* show the diagram of FIG. 2, wherein signal paths of an optical section probe signal and reflected power portions thereof for measuring the section latency have been included (FIG. 3*a*) and a diagram illustrating a curve of an electrical receive signal corresponding to optical reflection signals (reflected power portions of an optical section probe signal) (FIG. 3*b*)

The signals described above and the state of the optical ON/OFF switches are shown in FIG. 3a. The propagation of the optical section probe signal (as the case may be, a transmitted power portion thereof) in the direction toward the delimiter elements 148 is shown in a dashed line. The direction of the propagation is illustrated by the respective arrows. Likewise, the optical section probe signal that is reflected at the (remote) delimiter element 148 of the delimiter device 120 and propagates to the optical probe signal transceiver device 132 is illustrated in a dashed line with arrows illustrating the propagation direction.

FIG. 3b shows a graph of an exemplary electrical signal created by the time delay measurement device 144 either by simply scanning the signals received, e.g. if an OTDR using a simple narrow pulse as an optical section probe signal is used as a time delay measurement device 144, or by processing the signals received, e.g. if a correlation OTDR using a more complex series of pulses as an optical section probe signal is used as a time delay measurement device 144. The graph shows two peaks 156 and 158, wherein the first peak 156 corresponds to the power portion of the optical section probe signal reflected by the delimiter element 148 of the delimiter device 118 within the node 106 and the second peak 158 corresponds to the power portion of the optical section probe signal reflected by the delimiter element 148 of the delimiter device 120 within the (remote) node 102 (or 106).

The control device 152 receives the time difference $\Delta t$ and calculates the section latency $\tau_S = \Delta t/2$. As indicated by the arrow, the control device may transmit the section latency $\tau_S$ to the central control device 154 (FIG. 1), which calculates the link latency $\tau_L$. As already mentioned, this may be done by means of any type of communication channel that is established between the respective node and the central control device 154. The control channel may be established by using a wanted signal that is transmitted over the optical transmission link 100 (between the respective node and an end node 102, if the node that measures the respective section latency is not one of the end nodes 102, 104).

It should be noted that the design of the nodes in the Figures does not include any means or equipment that might be comprised within the nodes in order to create or process wanted signals. For example, one or more of the pass-through nodes 106 may be add/drop nodes of an optical transmission link 100 which is a WDM transmission link.

It should further be mentioned that the means required for measuring the section latency may also be included in an end node. As no pass-through latency needs to be measured in an end node, a second delimiter device 120 and the respective probe signal path as well as the optical switches can be omitted.

Almost the same applies for a pass-through node 106 if the pass-through node is not configured to measure the pass-through latency $\tau_{PT}$. However, in this case, the second delimiter device 120 must not be omitted as this is required for measuring the section latency that is defined by the delimiter element of this delimiter device. In this embodiment, the pass-through latency may be determined theoretically or measured by using additional equipment before installing the node within the optical transmission path or when the node and the transmission link is out of service. The theoretically determined or measured pass-through latency (at one or more wavelengths and/or at one or more temperatures, as the case may be, together with analytical dependencies) may be stored within the node, e.g. in a dedicated storage or storage area of the control device 152. The node may also comprise a temperature sensor that is connected to the control device 152. In this way, the control device may determine the pass-through latency using stored values or an analytical dependency of the pass-through latency on the temperature and communicate the value determined to the central control device 154.

It is of course also possible to measure the section latency $\tau_S$ between the delimiter element 148 of the second delimiter device 120 of a given pass-through node 106 and a neighboring pass-through node 106 or the end node 104, wherein the neighboring nodes include a first or western delimiter device 118 (comprising a delimiter element 148) which is configured to reflect a portion of the respective section probe signal that is received at the western connection port 110 and to output the reflected portion to this connection port 110. In such embodiments, the second delimiter device 120 of the pass-through node 106 is configured to reflect a power portion of the section probe signal that is supplied to its probe signal port 126 (at the delimiter element 148) and to forward a first portion of this reflected portion to its second port 124 and the connection port 112, respectively, and a second portion to the signal probe port 126 and the optical transceiver port 134 of the optical probe signal transceiver 132. In this way, the time delay of the signal portion that is directly reflected by the second delimiter device 120 and the time delay of the signal portion that is reflected by the first delimiter device 118 of the neighboring node 106 (or 104) can be measured by the time delay measurement device 144.

It would therefore be possible to design an optical transmission link 100 in such a way that only every second pass-through node is configured to measure the connection latencies of both neighboring (eastern and western) sections. The pass-through latencies of the intermediate pass-through nodes could be determined theoretically or by before putting them into service as explained above. Thus, it would be possible to use intermediate pass-through nodes without means for measuring the section and/or pass-through latencies.

Figure 4:
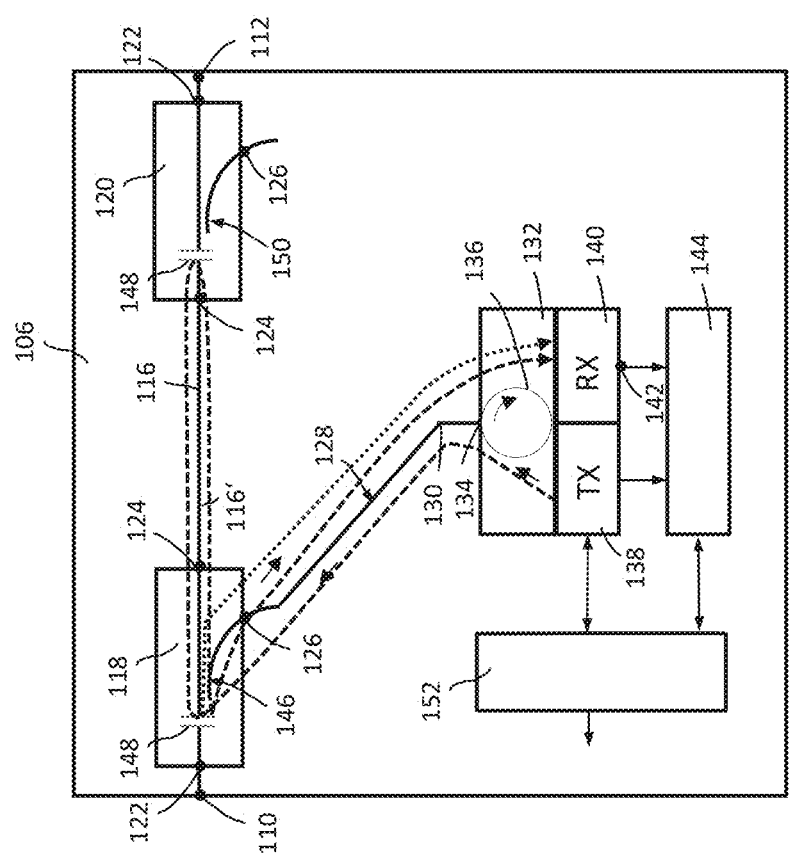
FIG. 4 shows a schematic diagram of an optical pass-through node comprising a bidirectional pass-through path, which also illustrates the propagation of the optical pass-through probe signal and its reflected portions for measuring the pass-through latency.

FIG. 4 shows an embodiment of an optical pass-through node 106 comprising a bidirectional optical pass-through path 116. Compared to the design of the node 106 in FIGS. 2 and 3, this design of an optical pass-through path does not comprise optical ON/OFF switches and an optical 1×2 coupler 130 including a branch of the optical probe signal path that is connected to the probe signal port 126 of the eastern delimiter device 120.

In such an embodiment of an optical pass-through path 106, the pass-through latency of the internal optical pass-through path 116' can be measured as follows:

The control device 152 controls the optical probe signal transceiver to create, at a start time $t_{start}$, an optical pass-through probe signal, which is output at the optical transceiver port 134 via the optical circulator 136. This optical pass-through signal (which may have the same or a different structure than an optical section probe signal) propagates to the delimiter element 148 of the delimiter device 118 via the optical probe signal path 128, the optical coupler 146 and the internal optical pass-through path 116' (this is illustrated in FIG. 4 by the respective dashed line between the optical transmitter 138 and the delimiter element 148 of the delimiter device 118). The delimiter element 148 reflects a power portion of this signal that propagates in the internal optical pass-through path toward the delimiter device 120. A power portion of this reflected optical pass-through probe signal is tapped off by the optical coupler 146 and this power portion is received at the optical transceiver port 134 (this is illustrated in FIG. 4 by the respective dotted line between delimiter element 148 of the delimiter device 118 and the optical receiver 140). The circulator 136 forwards this optical signal to the optical receiver 140. As explained above in connection with the measurement of the section latency, a delay time $t_3$ of the reflected optical pass-through probe signal relative to the start time $t_{start}$ measured by the time delay is measurement device 144, as the case may be, under control of the control device 152.

The optical coupler 146 transmits the major portion of the optical pass-through probe signal that has been reflected by the delimiter element 148 toward the delimiter element 148 of the delimiter device 120 (this is illustrated in FIG. 4 by the respective dashed line between delimiter element 148 of the delimiter device 120 and delimiter element 148 of the delimiter device 118). This delimiter element 148 again reflects a (minor) portion of this optical pass-through probe signal, which propagates to the delimiter element 148 of the delimiter device 118. Here, this signal is again reflected and a minor power portion of the reflected power portion is tapped off by the optical coupler 146. This (threefold reflected) optical pass-through probe signal is received at the optical transceiver port 134 (this is illustrated in FIG. 4 by the dashed line between the delimiter element 148 of the delimiter device 118 and the optical receiver 140) and the optical receiver 140 converts this optical signal into a corresponding electrical signal that is processed by the time delay measurement device 144. The time delay measurement device 144 measures the delay time $t_4$ of the threefold reflected optical pass-through probe signal relative to the start time $t_{start}$ and determines the time difference $\Delta t = t_4 - t_3$. As explained above, the time delay measurement device may also be configured to directly determine the time difference $\Delta t$.

The control device 152 may then calculate the pass-through latency as half the time difference $\Delta t$, i.e. $t_{PT} = \Delta t/2$.

It should be noted that this method for measuring the pass-through latency $\tau_{PT}$ may be performed simultaneously with the method for measuring the section latency explained above if the optical section probe signal is used as optical pass-through probe signal or vice versa, i.e. an optical probe signal is used for both measurements. In this combined method, the time delays $t_1$ and $t_3$ are identical. Thus, the section latency $\tau_S$ may be calculated as $\tau_S = (t_2 - t_1)/2$ and the pass-through latency $\tau_{PT}$ may be calculated as $\tau_{PT} = (t_4 - t_1)/2$ (note that generally $t_2$ will be greater than $t_4$ as the optical fiber comprised by the optical section path 114' is usually longer than the internal optical pass-through path 116').

FIG. 5 shows the embodiment of an optical pass-through node 106 according to FIG. 2, which comprises a bidirectional optical pass-through path 116. Even if it is not strictly required to provide the optical ON/OFF switches within the branches 128b and 128c of the optical probe path 128, corresponding switches have been included in this embodiment in order to provide a greater flexibility. For example, the optical ON/OFF switch 129b may be controlled into the open state and the optical ON/OFF switch 129a into the closed state, if the control device 152 controls the optical probe signal transceiver 132 and the time delay measurement device 144 in such a way that the section latency is measured (as described above).

In such an embodiment of an optical pass-through path 106, the pass-through latency of the unidirectional internal optical pass-through path 116' (the internal optical pass-through path 116' comprises a unidirectional optical element or device, e.g. an optical amplifier as shown in FIG. 5) can be measured as follows:

The control device 152 controls the optical probe signal transceiver to create, at a start time $t_{start}$, an optical pass-through probe signal, which is output at the optical transceiver port 134 via the optical circulator 136. This optical pass-through signal propagates to the delimiter element 148 of the delimiter device 118 via the optical probe signal path 128, the optical coupler 146 and the internal optical pass-through path 116' (this is illustrated in FIG. 5 by the respective dashed line between the optical transmitter 138 and the delimiter element 148 of the delimiter device 118). The delimiter element 148 reflects a power portion of this signal that propagates in the internal optical pass-through path toward the delimiter device 120. A power portion of this reflected optical pass-through probe signal is tapped off by the optical coupler 146 and this power portion is received at the optical transceiver port 134. The circulator 136 forwards this optical signal to the optical receiver 140 (this is illustrated in FIG. 5 by the respective dotted line between delimiter element 148 of the delimiter device 118 and the optical receiver 140). As explained above in connection with the measurement of the section latency, a delay time $t_5$ of the reflected optical pass-through probe signal relative to the start time $t_{start}$ is measured by the time delay measurement device 144, as the case may be, under control of the control device 152.

The optical coupler 146 transmits the major portion of the optical pass-through probe signal that has been reflected by the delimiter element 148 toward the delimiter element 148 of the delimiter device 120. This delimiter element 148 transmits a (major) portion of this optical pass-through probe signal and a minor power portion thereof is tapped off by the optical coupler 150 which propagates to the optical transceiver port 134 via the branch 128c of the optical probe signal path 128 (which includes the optical ON/OFF switch 129b that is also controlled into the closed state) and the optical circulator 136 forwards this signal to the optical receiver 140 (this signal path is illustrated in FIG. 5 by the dashed line between the delimiter element 148 of the delimiter device 118 and the optical receiver 140 via the delimiter device 120). The optical receiver 140 converts this optical signal into a corresponding electrical signal that is processed by the time delay measurement device 144. The time delay measurement device 144 measures a delay time $t_7$ of this (power portion of the) optical pass-through probe signal relative to the start time $t_{start}$.

As the optical pass-through signal that is created by the optical transmitter 138 is split by the optical 1×2-coupler 130, a power portion thereof (preferably a 50% power portion thereof) propagates to the delimiter element 148 of the delimiter device 120 via the branch 128c of the optical probe signal path 128, the probe signal port 126 of the delimiter device 120, the optical coupler 150 and a respective portion of the optical pass-through path 116 (this is illustrated in FIG. 5 by the dotted line between the optical coupler 130 that splits off from the dashed line and the delimiter element 148 of the delimiter device 120). This optical pass-through probe signal is reflected by the delimiter element 148 of the delimiter device 120 and a power portion thereof, which is tapped of by the optical coupler 150, is fed to the optical receiver 140 via the branch 128c of the optical probe signal path 128, the optical coupler 130, the common branch 128a and the optical circulator 136. A further delay time $t_6$ of this (directly reflected) optical pass-through probe signal relative to the start time $t_{start}$ is measured by the time delay measurement device 144.

In a final measurement step, the control device 152 calculates the pass-through latency $\tau_{PT}$ as the difference between the delay time $t_7$ and half the sum of the delay times times $t_5$ and $t_6$, i.e. $t_{PT}=t_7-(t_5+t_6)/2$. That is, the pass-through latency $\tau_{PT}$ is calculated by subtracting from the "round trip delay time" $t_7$ the delay times $t_5$ and $t_6$ of the signals that are directly reflected by the delimiter devices 118 and 120 (i.e. the delimiter elements thereof), respectively.

This method allows the measurement of the pass-through latency of a pass-through node 106 that comprises a unidirectional internal pass-through path 116'. However, this method may of course also be used in connection with a pass-through node in which the internal pass-through path 116' (and of course also the pass-through path 116 between the connection ports 110 and 112) is bidirectional.

One problem in connection with the method described above with reference to FIG. 5 is that the lengths of the optical paths via the branches 128b and 128c of the optical probe signal path 128 may lie very close to each other so that even an highly accurate and high resolution method for determining the delay times of the optical signals that are directly reflected by the delimiter elements 148 of the delimiter devices 118 and 120, respectively, cannot guarantee that the respective reflected signal portions can be resolved, i.e. distinguished from each other. Thus, determining the time delays $t_5$ and $t_6$ might be impossible or inaccurate.

In order to solve this problem, the delay times of the directly reflected power portions of the optical pass-through probe signal can be measured separately by appropriately controlling the state of the optical ON/OFF switches 129a, 129b. In the first measurement step, the delay time $t_5$ of the power portion of the optical pass-through probe signal that is directly reflected by the delimiter element 148 of the delimiter device 118 can be measured, while the optical ON/OFF switch 129a is in a closed state and the ON/OFF switch 129b is in an open state (i.e the optical probe signal path between the signal probe port 126 of the delimiter device 120 and the optical coupler 130 is interrupted).

In a second measurement step, the delay time $t_6$ of the power portion of the optical pass-through probe signal that is directly reflected by the delimiter element 148 of the delimiter device 120 can be measured, while the optical ON/OFF switch 129b is in a closed state and the ON/OFF switch 129a is in an open state (i.e the optical probe signal path between the signal probe port 126 of the delimiter device 118 and the optical coupler 130 is interrupted).

Thus, the two critical time delays $t_5$ and $t_6$ are measured independently from each other as the respective other directly reflected optical signal is blocked by the respective optical switch.

In a third measurement step, both optical ON/OFF switches 129a, 129b are controlled into the closed state. In this step, the optical time delay measurement device 144 measures (as the case may be, under the control of the control device 152) only measure the time delay $t_7$ of the "round trip signal". As this time delay is significantly greater than the time delays $t_5$ and $t_6$ of the directly reflected power portions of the optical pass-through probe signal, it can be guaranteed that this signal can be distinguished from the directly reflected signals.

The delimiter element 148 and the delimiter devices 118, 120 can be implemented in any appropriate manner that assures the functionality described above. For example, the delimiter element 148 may be implemented as air gap or any other partially reflective optical filter. The spectral filter properties thereof at wavelengths or within spectral bandwidths that are reserved for the optical (section or pass-through) probe signals may be the same or different for the wavelengths (or the spectral bandwidth) that are reserved for wanted optical signals. At any rated, a delimiter element must be designed in such a way that no or an acceptably low attenuation is introduced into the optical link path (i.e. into the pass-through path) at the wavelengths or within spectral bandwidths that are reserved for the wanted optical signals and that a sufficiently high power portion is reflected at wavelengths or within spectral bandwidths that are reserved for the optical (section or pass-through) probe signals.

As already explained above, the probe signals may have exactly the wavelength of a wanted optical signal. However, in this case, the measurements for determining the section latencies and the pass-through latencies must be carried out when the link is out of service (at least with regard to the specific wavelength, i.e. no wanted data signal should be present during the measurements). Such embodiments have the advantage that the link latency is exactly measured at the wavelength of the wanted optical signals.

A further alternative to implement the delimiter devices 118, 120 is shown in FIGS. 6a-6c. This delimiter device 200 has three ports 1, 2 and 3 and comprises a wavelength-dependent filter 160, which acts as a delimiter element and which may be implemented as thin-film filter, and a fully reflective, wavelength-independent mirror 162, which takes over, in combination with the filter 160, the role of the optical tap-off coupler described above. These elements may, for example, be realized using any appropriate integrated optics technique. They may be implemented on a common substrate that also defines the ports 1, 2 and 3.

The ports 1, 2 and 3 correspond to the ports 122, 124 and 126 of the delimiter devices 118 and to ports 124, 122 and 126 of the delimiter devices 120 shown in FIGS. 2, 3, 4 and 5.

The filter 160 is designed in such a way that it fully reflects the wavelengths or spectral bandwidths reserved for the transmission of wanted optical signals and partially reflects a power portion (e.g. a power portion of 10%) of the wavelengths or spectral bandwidths reserved for optical (section and pass-through) probe signals. The mirror 162 fully reflects any wavelength within the spectrum of the probe and wanted signals. In this way, the behavior of the delimiter device 200 (with respect to the transfer loss between two selected ports 1, 2, 3) according to the tables shown in FIGS. 6b and 6c can be achieved, wherein the table in FIG. 6b shows the transfer loss for a probe signal (i.e. within a spectral bandwidth that is reserved for the probe signals) and the table in FIG. 6c shows the transfer loss for a wanted signal (i.e. within a spectral bandwidth that is reserved for the wanted signals). The tables present the approximate typical resulting transfer losses, neglecting any excess loss.

As can be seen by the table in FIG. 6c, the delimiter device 200 reveals essentially no transfer loss for a wanted optical signal that is transmitted from port 1 to port 2 and vice versa, as the filter 162 fully reflects the respective wavelength. No reflection occurs at the ports 1, 2 for a wanted signal wavelength (i.e. the transfer losses from port 1 to port 1 and port 2 to port 2 are minus infinity, when expressed in decibel units). The property of the device 200 that it fully reflects at port 3 an optical signal having a wanted signal wavelength play no role as the device 200 is only used for embodiments of an optical transmission link 100 in which the probe signals and the wanted signals have different wavelengths.

Due to the partial reflectivity of the filter 160 for an optical probe signal wavelength, the delimiter device 200 shows the insertion losses according to FIG. 6b. Especially, a major power portion of a probe signal that is fed to port 3 is transmitted to port 1, a first minor portion is fed to port 2 (by being partially reflected at the filter 160, fully reflected at the mirror 162 and partially transmitted through the filter 160) and a second minor portion is fed to port 3 (i.e. directly reflected to port 3 by being partially reflected at the filter 160, fully reflected at the mirror 162 and again partially reflected at the filter 160). A major power portion of a probe signal that is fed to port 1 is transmitted to port 3 and a minor power portion thereof is reflected (by the filter 160) to port 2. A major power portion of a probe signal that is fed to port 2 is reflected to port 2 (by being partially transmitted through the filter 160, fully reflected at the mirror 162 and again partially transmitted through the filter 160), a first minor portion is fed to port 1 (by being partially reflected at the filter 160) and a second minor portion is fed to port 3 (by being partially transmitted through the filter 160, reflected at the mirror 162, partially reflected at the filter 160).

It should be noted that this design of a delimiter device 200 shows a minus infinity insertion loss for port 1 to port 1, i.e. there is no reflection of a probe signal that is fed to port 1. Thus, the delimiter device 200 cannot be used to measure the pass-through latency $\tau_{PT}$ as explained with reference to FIG. 4, as there would be no reflection of the optical pass-through probe that is fed to port 124 of the delimiter device 120, i.e the time delay $t_4$ cannot be measured.

It can be shown that the optical path between the reflection point of an optical signal on the surface of the optical filter 160 and the reflection point of the signal on the surface of the mirror 162 plays no role for the measurement of the link latency $\tau_L$ if (in this respect) identical delimiter devices are used on both sides of an optical section path 114' (i.e the delimiter devices have the same geometrical design with respect to the optical paths between the optical filter 160 and the mirror 162). The same applies for the measurement of the pass-through latency $\tau_{PT}$, i.e. (in this respect) identical delimiter devices should be used at both sides of the respective pass-through node 106.

Generally, if a latency has been measured at a wavelength that differs from the wavelength of a wanted signal, a conversion of the measured latency to the respective target wavelength must be carried out. This can be done by interpolation or extrapolation of any type. For example, the latency can be measured at two different wavelengths (e.g. one above and one below the target wavelength) and a linear interpolation or extrapolation can be carried out.

The fiber latency at a target wavelength, $\tau(\lambda_t)$, can be expressed as a function of the latency measurements at two wavelengths, $\lambda_1$ and $\lambda_2$ by the following equation (1):

$$\tau(\lambda_t) = \tau(\lambda_1) + \frac{\tau(\lambda_2) - \tau(\lambda_1)}{\lambda_2 - \lambda_1}(\lambda_t - \lambda_1) - \frac{S \cdot c}{4 \cdot n_g}[\tau(\lambda_1) + \tau(\lambda_2)](\lambda_2 - \lambda_t)(\lambda_t - \lambda_1) \quad (1)$$

Here, S is the dispersion slope at the target wavelength, c is the speed of light $$\left(2.998 \cdot 10^8 \frac{m}{s}\right),$$

and $n_g$ is the group refractive index of the fiber (typical value: 1.47 for standard single-mode fiber). The first two terms in the equation express the linear interpolation between the two measured wavelengths (or extrapolation, if the target wavelength is not located between the measured wavelengths), the third term takes into account the change of chromatic dispersion over the wavelength (dispersion slope) and therefore the curvature of the latency over wavelength.

If three wavelengths are used for the measurement, the dispersion slope, S, can be derived from equation (1).

If only two wavelengths are used, the dispersion slope can be estimated from statistics, which can for instance be found in Recommendation ITU-T G.652 for a standard single mode fiber. For example, evaluation of the comprehensive measurements of minimum and maximum chromatic dispersion over wavelengths yields a dispersion slope S for 1550.0 nm, which shows a linear correlation with the chromatic dispersion coefficient D at the same wavelength with $$S = \frac{0.0022}{nm} \cdot D + 0.0209 \frac{ps}{nm^2 \cdot km}. \quad (2)$$

The chromatic dispersion coefficient D can be derived from the latency measurements at the two wavelengths via the latency difference and the physical length of the fiber. The physical length of the fiber can be determined from the latency measurements as $$L_{fiber} = \frac{[\tau(\lambda_1) + \tau(\lambda_2)] \cdot c}{2 \cdot n_g}, \quad (3)$$

with the values for c and $n_g$ as above. The chromatic dispersion coefficient at the center wavelength between $\lambda_1$ and $\lambda_2$ is then obtained from the measured latencies as $$D\left(\frac{\lambda_1+\lambda_2}{2}\right) = \frac{\tau(\lambda_2)-\tau(\lambda_1)}{(\lambda_2-\lambda_1)\cdot L_{fiber}}. \quad (4)$$

For other wavelengths than 1550 nm or other fiber types, the coefficients in Eq. (2) need to be adapted based on literature or spec values.

Once the dispersion has been measured, for monitoring the latency at the target wavelength in operation, only a single monitoring wavelength, $\lambda_m$ is required. This wavelength can differ from the measurement wavelengths used in the first step. Using the parameters obtained in the first step, the chromatic dispersion coefficient between the measurement wavelength and the target wavelength is calculated as $$D\left(\frac{\lambda_m+\lambda_t}{2}\right) = D\left(\frac{\lambda_1+\lambda_2}{2}\right) + S\cdot\frac{\lambda_m+\lambda_t-\lambda_1-\lambda_2}{2} \quad (5)$$

The latency at the target wavelength is then obtained as $$\tau(\lambda_t) = \tau(\lambda_m) + D\left(\frac{\lambda_m+\lambda_t}{2}\right)\cdot L_{fiber}\cdot(\lambda_t-\lambda_m). \quad (6)$$

By providing demarcations between sections of an optical transmission link the invention makes it possible to exactly measure the section latencies. The optical paths of the measurement device and the demarcations do not influence the measurement results. Further, the invention provides a pass-through node with integrated measurement equipment for measuring the (respective neighboring) section latency and the respective pass-through latency. These latencies can be measured at the respective wanted signal wavelength of interest (i.e. the target wavelength) or at one or more differing wavelengths, wherein respective latency at the desired target wavelength can be determined by a conversion method.

The measurement method according to the invention can be carried out on request or at predetermined points in time. According to the invention, the reflected probe signals, especially the probe signal reflected by a remote delimiter device, may not only be used to determine the respective time delay. Additionally, the optical power may be detected and monitored, so that it is possible to detect any effect that decreases (or, as the case may be, increases) the optical power of the reflected probe signal received.

LIST OF REFERENCE SIGNS 100 optical transmission link
102 end node
104 end node
106 pass-through node
108 optical link path
110 first (western) connection port
112 second (eastern) connection port
114 optical connecting path
114' optical section path
116 optical pass-through path
116' internal optical pass-through path
118 delimiter device (at western connection port)
120 delimiter device (at eastern connection port)
122 first port
124 second port
126 probe signal port
128 probe signal path
128a common branch of the probe signal path
128b first branch of the probe signal path
128c second branch of the probe signal path
129a controllable optical ON/OFF switch
129b controllable optical ON/OFF switch
130 optical 1×2 coupler
132 optical probe signal transceiver
134 optical transceiver port
136 optical circulator
138 Optical transmitter
140 optical receiver
142 electrical output port
144 time delay measurement device
146 optical 1×2 coupler
148 delimiter element
150 optical 1×2 coupler
152 control device
154 central control device
156 peak
158 peak
160 optical filter
162 mirror
$N_0$ end node 102
$N_N$ end node 104
$N_1$ to $N_{n-1}$ pass-through nodes 106
$\tau_L$ link latency
$\tau_{TP}$ pass-through latency
$\tau_S$ section latency
$t_{start}$ start time
$t_1$ to $t_7$ time delay
$\Delta t$ time difference

The invention claimed is:
1. A method for determining the link latency of an optical transmission link,
(a) wherein the optical transmission link comprises an end node at each end thereof and one or more pass-through nodes, wherein each pair of neighboring nodes is connected, at a connection port of each node, by an optical connecting path, and wherein each pass-through node comprises an optical pass-through path between its connection ports, the optical connecting paths and optical pass-through paths forming an optical link path, and
(b) wherein a delimiter device comprising a delimiter element is provided at each connection port of each node, and wherein the delimiter element forms a demarcation within the optical link path,
the method comprising the steps of:
(c) measuring, for each pair of neighboring nodes, a section latency by
(i) transmitting a section probe signal from a first one of the pair of nodes to the second one of the pair of nodes,
(ii) measuring, at the first node, a first time delay of a first reflection signal, which is created by the delimiter element of the delimiter device of the first node by reflecting a power portion of the section probe signal, and a second time delay of a second reflection signal, which is created by the delimiter element of the delimiter device of the second node by reflecting a power portion of the section probe signal received from the first node, and (iii) calculating the section latency as half the difference between the second time delay and the first time delay, (d) determining, for each pass-through node either theoretically or by measurement, a pass-through latency of an internal optical pass-through path between the delimiter elements of the delimiter devices of the respective pass-through node, and (e) adding all section latencies and pass-through latencies in order to obtain the link latency of the optical link path.

2. The method according to claim 1, wherein the pass-through latency of a bidirectional internal optical pass-through path of a pass-through node is determined by (a) feeding, at a start time, the pass-through probe signal, via a probe signal path, to a first one of the delimiter devices, (b) measuring, relative to the start time or another reference time, a first time delay of a first reflection signal created by the first delimiter device by reflecting a power portion of the pass-through probe signal into the probe signal path, (c) measuring, relative to the start time or another reference time, a second time delay of a second reflection signal created by a second one of the delimiter devices by reflecting a power portion of the pass-through probe signal that is transmitted by the first delimiter device to the second delimiter device via the optical pass-through path, wherein the first delimiter device is configured to transmit a power portion of the pass-through probe signal reflected by the second delimiter device to the probe signal path, (d) or by directly measuring the time delay between the first and second reflection signal, and (e) calculating the pass-through latency as half the difference between the separately measured second and first time delay or as half the directly measured time delay.

3. The method according to claim 1, wherein the pass-through latency of a unidirectional or bidirectional optical pass-through path of a pass-through node, which comprises a common probe signal path that is split into a first probe signal path connected to a first one of the delimiter devices and a second probe signal path connected to a second one of the delimiter devices, is determined by (a) measuring a first time delay of a reflection signal created by the first one of the delimiter devices by reflecting, into the first probe signal path, a power portion of a pass-through probe signal that is fed to the common probe signal path, (b) measuring a second time delay of a reflection signal created by the second one of the delimiter devices by reflecting, into the second probe signal path, a power portion of the same or another pass-through probe signal, (c) measuring a third time delay of a transmission signal created by feeding the same or another pass-through probe signal to the first delimiter device, which is configured to transmit a power portion of the pass-through probe signal, via the internal optical pass-through path, to the respective other delimiter device, which is configured to transmit at least a power portion of the pass-through probe signal received, as the transmission signal, to the second probe signal path, and (d) calculating the pass-through latency as the difference of the third time delay and half the sum of the first time delay and the second time delay.

4. The method according to claim 3, wherein (a) the measurement of the first time delay is carried out using one or more first pass-through probe signals, wherein the second probe signal path is blocked during this measurement step, e.g. by means of an optical switch, that the measurement of the second time delay is carried out using one or more second pass-through probe signals, wherein the first probe signal path is blocked during this measurement step, e.g. by means of an optical switch, and that the measurement of the third time delay is carried out using one or more third pass-through probe signals, and wherein the first and second probe signal path are not blocked during this measurement step.

5. The method according to claim 1, wherein the section or pass-through probe signals have a wavelength equal to a wavelength of a wanted data signal that is transmitted over the optical transmission link when it is in operation, wherein determining of the section and node latencies is carried out when the optical transmission link is out of service.

6. The method according to claim 1, wherein the section or pass-through probe signals have a wavelength outside a bandwidth that is reserved for wanted data signals that are transmitted over the optical transmission link when it is in operation, and wherein determining of the section and node latencies is carried out when the optical transmission link is in or out of service.

7. The method according to claim 6, wherein the optical transmission link is monitored by carrying out the method on request or at predetermined points in time.

8. The method according to claim 6, wherein each section and pass-through latency is determined at two or more different wavelengths, preferably at at least one wavelength above and below a wavelength of a wanted data signal or the bandwidth that is reserved for wanted data signals, and wherein the section or pass-through latencies are calculated using linear or non-linear interpolation or an analytical dependency of the respective section or pass-through latency on the wavelength taking into account known properties or parameters of the connecting paths or the optical pass-through paths.

9. An optical transmission link comprising (a) an end node at each end thereof and one or more pass-through nodes and a central control device, which is connected to selected ones of the end nodes and pass-through nodes, wherein a first node of each pair of neighboring nodes comprises a first connection port and a second node of the respective pair of neighboring nodes comprises a second connection port, the first and second connection ports being connected by an optical connecting path, and wherein each pass-through node comprises an optical pass-through path which optically connects its connection ports, the optical connecting paths and optical pass-through paths forming an optical link path, (b) wherein a first node of each pair of neighboring nodes comprises (i) an optical probe signal transceiver configured to create and output, at an optical transceiver port, optical probe signals and to receive, at the optical transceiver port, reflected or transmitted probe signal portions and to output, at an electrical output port, an electrical receive signal that is created by opto-electrically converting the reflected or transmitted probe signal portions received, (ii) a first delimiter device comprising a first port, which is connected to or defines the first connection port and which has a probe signal port that is connected to the optical transceiver port via an optical probe signal path, (iii) wherein the first delimiter device is configured to create, by means of a delimiter element provided within the optical pass-through path, a first reflection signal by reflecting a power portion of a probe signal received at the probe signal port, the first reflection signal being output at the probe signal port, and to transmit a power portion of the probe signal to the first connection port, (iv) a time delay measurement device to which the electrical receive signal is fed by the optical probe signal transceiver, the time delay measurement device being configured to measure one or more time delays between at least a first and a second signal from the group of a transmitted probe signal, a reflected probe signal portion and a transmitted probe signal portion, and (v) a control device which is configured to control the optical probe signal transceiver and the time delay measurement device, (c) wherein the second node of each pair of neighboring nodes comprises a second delimiter device having a first port, which is connected to or defines the second connection port, the second delimiter device being configured to reflect, by means of a delimiter element provided within the optical pass-through path, a power portion of a probe signal received at the second connection port, the reflected power portion of the probe signal being output at the first port, and (d) wherein each control device of each first node is configured to control the optical probe signal transceiver and the time delay measurement device in such a way (i) that the optical probe signal transceiver creates a section probe signal at a start time, wherein a first reflection signal created by the first delimiter device of the first node and a second reflection signal created by the second delimiter device of the second node are received and opto-electrically converted by the optical probe signal transceiver, and (ii) that the time delay measurement device measures, relative to the start time or another reference time, a first time delay of a first reflection signal created by the first delimiter device by reflecting a power portion of the section probe signal, and a second time delay of a second reflection signal created by the second delimiter device by reflecting a power portion of the section probe signal received from the first node, (iii) wherein each control device of each first node is configured to calculate a section latency of the optical path between the delimiter element of the delimiter device of the first node and the delimiter element of the delimiter device of the second node of the respective pair of nodes as half the difference between the second time delay and the first time delay, and (e) wherein the central control device is configured to receive all section latencies from each first node of each pair of neighboring nodes and to determine a link latency of the optical link path using the sum of all section latencies and a sum of all pass-through latencies.

10. The optical transmission link according to claim 9, wherein each pass-through node is configured to measure its pass-through latency and to communicate the pass-through latency to the central control device and that the central control device determines the link latency by adding all pass-through latencies and all section latencies.

11. A pass-through node for an optical transmission link according to claim 9, comprising (a) a first and a second connection port, each of which is configured to be connected to an optical connecting path of the optical transmission link, an optical pass-through path connecting the first and second connection ports, a first and a second delimiter device provided at the first and second connection ports within the optical pass-through path, an optical probe signal transceiver having an optical transceiver port and an electrical output port, a time delay measurement device and a control device, (b) wherein a first port of the first delimiter device is connected to or defines the first connection port and a first port of the second delimiter device is connected to or defines the second connection port, (c) wherein second ports of the first and second delimiter devices are connected to an inner portion of the optical pass-through path, (d) wherein a probe signal port of the first delimiter device is connected to an optical probe signal path, which connects the optical probe signal port and the optical transceiver port of the optical probe signal transceiver, (e) wherein the optical probe signal transceiver is configured to create and output, at the optical transceiver port, at least one probe signal and to receive, at the optical transceiver port, reflected or transmitted probe signal portions and to output, at the electrical output port, an electrical receive signal that is created by opto-electrically converting the reflected or transmitted probe signal portions received, (f) wherein the first delimiter device is configured (i) to reflect, by means of a delimiter element provided within the optical pass-through path, a power portion of a probe signal received at the probe signal port and to output at least a portion of the reflected power portion at the probe signal port, (ii) to transmit a power portion of a probe signal received at the probe signal port to its first port, and (iii) to transmit at least a power portion of a probe signal received at the first port to the probe signal port, (g) wherein the second delimiter device is configured to reflect, by means of a delimiter element provided within the optical pass-through path, a power portion of a probe signal received at the first port and to output at least a power portion of the reflected power portion at the first port, (h) wherein the time delay measurement device is configured to measure one or more time delays between at least a first and a second signal from the group of a transmitted probe signal, a reflected probe signal portion and a transmitted probe signal portion, and (i) wherein the control device is configured to control the optical probe signal transceiver and the time delay measurement device, when the pass-through node is in operation in the optical transmission link, in such a way (i) that the optical probe signal transceiver creates a section probe signal at a start time and receives a reflection signal created by the first delimiter device according to feature (f) (i) and a transmission signal, which is created by the delimiter device of a neighboring node and transmitted by the first delimiter device according to feature (f) (iii) and outputs corresponding opto-electrically converted signals to the time delay measurement device, and (ii) that the time delay measurement device measures, relative to the start time or another reference time, a first time delay of the reflection signal and a second time delay of the transmission signal, and (j) wherein the control device is configured to calculate a section latency as half the difference between the second time delay and the first time delay.

12. The pass-through node according to claim 11, wherein (a) the first delimiter device is further configured (i) to output, at the second port, a power portion of the reflected power portion of a probe signal received at the probe signal port, and (ii) to reflect a power portion of a probe signal received at the second port and to output at least a power portion thereof at the probe signal port, (b) the second delimiter device is further configured to reflect a power portion of a probe signal received at the second port and to output the reflected power portion at the second port, (c) wherein the control device is configured to control the optical probe signal transceiver and the time delay measurement device in such a way (i) that the optical probe signal transceiver creates a pass-through probe signal at a start time and receives a first reflection signal created by the first delimiter device according to feature (f) (i) of claim 11 and a second reflection signal created by the second delimiter device according to feature (b) herein and by the first delimiter device according to feature (a) (ii) herein, and outputs corresponding opto-electrically converted signals to the time delay measurement device, and (ii) that the time delay measurement device measures, relative to the start time or another reference time, a first time delay of the first reflection signal and a second time delay of the second reflection signal, and (d) wherein the control device is configured to calculate a pass-through latency as half the difference of the second time delay and the first time delay.

13. The pass-through node according to claim 11, wherein (a) the probe signal path comprises an optical 1×2 coupler, wherein a common port is connected to the optical transceiver port, a first splitting port is connected to the probe signal port of the first delimiter device and a second splitting port is connected to the probe signal port of the second delimiter device, (b) the first delimiter device is further configured to output, at the second port, a power portion of the reflected power portion of a probe signal received at the probe signal port, and (c) the second delimiter device is further configured (i) to reflect a power portion of a probe signal received at the probe signal port and to output at least a portion of the reflected power portion at the probe signal port, and (ii) to output, at the probe signal port, a power portion of a probe signal received at the second port, and (d) wherein the control device is configured to control the optical probe signal transceiver and the time delay measurement device in such a way (i) that the optical probe signal transceiver creates a pass-through probe signal at a start time and receives a first reflection signal created by the first delimiter device according to feature (f) (i), and a second reflection signal created by the second delimiter device according to feature (c) (i) and a transmission signal created by the first delimiter device according to feature (b) and the second delimiter device according to feature (c) (ii), and outputs corresponding opto-electrically converted signals to the time delay measurement device, and (ii) that the time delay measurement device measures, relative to the start time or another reference time, a first time delay of the first reflection signal, a second time delay of the second reflection signal and a third time delay of the transmission signal, and (e) wherein the control device is configured to calculate a pass-through latency as the difference of the third time delay and half the sum of the first and second time delays.

14. The pass-through node according to claim 13, wherein a first controllable optical ON/OFF switch is provided in the branch of the optical probe path between the optical 1×2 coupler and the probe signal port of the first delimiter device and that a second controllable optical ON/OFF switch is provided in the branch of the optical probe path between the optical 1×2 coupler and the probe signal port of the second delimiter device, wherein the controllable optical ON/OFF switches are controlled by the control device.

15. The pass-through node according to claim 14, wherein the control device is adapted, for determining the pass-through latency, (a) to control the first controllable optical ON/OFF switch into the ON-state and the second controllable optical ON/OFF switch into the OFF-state, to control the optical probe signal transceiver to create, at a first start time, a first optical pass-through probe signal and to control the time delay measurement device to measure, relative to the first start time, the first time delay of the first reflection signal created by the first delimiter device, (b) to control the first controllable optical ON/OFF switch into the OFF-state and the second controllable optical ON/OFF switch into the ON-state, to control the optical probe signal transceiver to create, at a second start time, a second optical pass-through probe signal and to control the time delay measurement device to measure, relative to the second start time, the second time delay of the second reflection signal created by the second delimiter device, and (c) to control the first and second controllable optical ON/OFF switches into the ON-state, to control the optical probe signal transceiver to create, at a third start time, a third optical pass-through probe signal and to control the time delay measurement device to measure, relative to the third start time, the third time delay of the transmission signal.

* * * * *